UNITED STATES PATENT OFFICE.

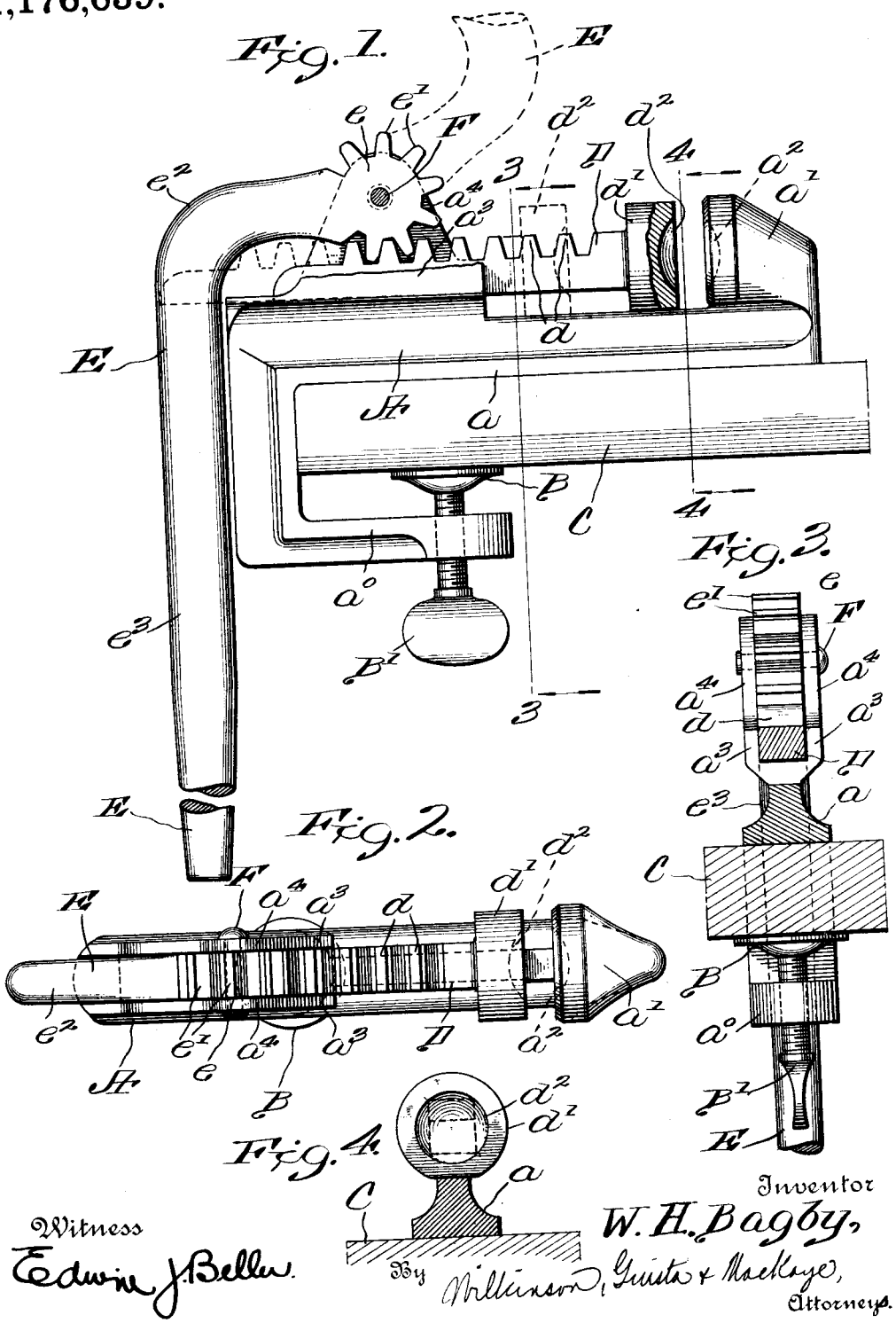

WILLIAM H. BAGBY, OF LOS ANGELES, CALIFORNIA.

NUTCRACKER.

1,176,639.

Specification of Letters Patent.

Patented Mar. 21, 1916.

Application filed September 1, 1915. Serial No. 48,480.

*To all whom it may concern:*

Be it known that I, WILLIAM H. BAGBY, a citizen of the United States, residing at Los Angeles, in the county of Los Angeles and State of California, have invented certain new and useful Improvements in Nutcrackers; and I do hereby declare the following to be a full, clear, and exact description of the invention, such as will enable others skilled in the art to which it appertains to make and use the same.

My invention relates to improvements in nut crackers, and it is intended to provide a nut cracker which may be quickly and conveniently operated, and to which sufficient force might be conveniently applied without the danger of unnecessarily crushing the nut.

My invention will be understood by reference to the accompanying drawings, in which similar reference symbols indicate similar parts throughout the several views.

Figure 1 is a side elevation of the apparatus as attached to a table or shelf, parts being broken away. Fig. 2 is a plan view of the device shown in Fig. 1, the table being omitted. Fig. 3 shows a section along the line 3—3 of Fig. 1, and looking in the direction of the arrows; and Fig. 4 shows a section along the line 4—4 of Fig. 1, and looking in the direction of the arrows.

A represents the main frame, which is provided with an upper bearing jaw $a$ and with a lower clamping jaw $a^\circ$, so that the frame may be readily slipped over the edge of a shelf or table such as C. This lower clamping jaw $a^\circ$ carries a suitable screw clamp B operated by the thumb lug B', whereby the frame may be securely attached to the shelf or table.

The upper part of the main frame is provided at its outer end with an abutment $a'$, which is provided with a curved recess $a^2$ to engage the end of the nut to be cracked. This frame is also provided with lateral guides $a^3$ and upwardly projecting ears $a^4$. The rack D is arranged to slide between the guides $a^3$ and the upwardly projecting ears $a^4$, and is provided with teeth $d$ and with head $d'$, recessed as at $d^2$ to receive the opposite side or opposite end of the nut from that engaging in the recess $a^2$ in the abutment $a'$.

E represents the handle, which is provided at its upper end with a segmental pinion $e$ having teeth $e'$ adapted to engage the teeth $d$ of the rack D. The handle E, with its pinion $e$ is pivoted on the bolt F between the ears $a^4$. This handle, near the pinion $e$, is bent downward substantially at right angles, as shown at $e^2$, and the longer arm $e^3$ serves to give a leverage to the pinion teeth for moving the rack D. The longer arm $e^3$ of the handle is shown as broken away in Fig. 1, as the arm $e^3$ should extend well below the lower edge of the main frame.

In operating the device the handle is lifted as shown in dotted lines in Fig. 1, withdrawing the rack D away from the recess $a^2$. The nut is then inserted and the rack is brought to bear against the same, and the pressure is applied to the handle, which will result in cracking the nut, but as soon as the nut is sufficiently cracked the arm $e^3$ of the handle will bring up against the end of the main frame, and will prevent the further movement of the rack D and thus will prevent the excessive crushing of the nut. Moreover, if the operator does not withdraw his fingers in time from the apparatus, this limiting of the movement of the rack would prevent his fingers from becoming crushed between the plunger head and the rack of the abutment of the frame.

By having the handle bent as shown, the device is operated with a downward thrust of the hand of the operator, which will enable him to add his weight to the efficiency of the machine.

The special advantage of the improved device is that it is simple and cheap in construction, it is not likely to get out of order, may be readily applied to a table or shelf, or the arm of a chair or the like, and may be operated with the expenditure of very little power, and without any risk of injuring the user.

Having thus described my invention, what I claim and desire to secure by Letters Patent of the United States, is:

A nut cracker comprising a frame provided with a holding member having a downwardly-projecting rear arm, the said frame being also provided with an abutment near its front end to engage the nut, and with a guideway and upwardly-projecting ears near the other end of said frame, with a cracking plunger traveling in said guideway and provided with a head adapted to engage the side of the nut opposite to said abutment, and an angular handle pivoted to said ears and provided with means for operating said plunger, the said handle being bent substantially at right angles near its pivot and having its longer arm extending below said first-mentioned arm and adapted to engage the same to stop the forward movement of the plunger, substantially as described.

In testimony whereof, I affix my signature.

WILLIAM H. BAGBY.